United States Patent [19]

Liou

[11] Patent Number: 4,549,324
[45] Date of Patent: Oct. 29, 1985

[54] COMBINATION OF SCREW SPANNER AND NUT BREAKER

[76] Inventor: Mou T. Liou, 33 Hsi Hu Rd., Ta Li Hsiang, Tai Chung Hsien, Taiwan

[21] Appl. No.: 611,858

[22] Filed: May 18, 1984

[51] Int. Cl.$^4$ ............................................... B25F 1/02
[52] U.S. Cl. ............................................ 7/142; 30/92; 30/168; 81/175
[58] Field of Search ...................... 7/142; 81/175, 176, 81/174; 30/168, 92

[56] References Cited

U.S. PATENT DOCUMENTS

| 86,138 | 1/1869 | Copeland | 30/92 |
| 2,879,592 | 3/1959 | Paul | 30/168 |

FOREIGN PATENT DOCUMENTS

| 25333 | 10/1922 | France | 81/175 |

Primary Examiner—Roscoe V. Parker
Attorney, Agent, or Firm—Ladas & Parry

[57] ABSTRACT

A combination of screw spanner and nut breaker includes a head piece having a nut receiving hole and a female threaded longitudinal hole, a tail piece having a first male threaded protrusion and a second male threaded protrusion, each of which is capable of threadingly engaging with the longitudinal hole, a first engaging piece having a first front end having an angled surface formed to match with an angle surface of a nutlike member, a second engaging piece having a second front end having a knife edge and a female threaded cover capable of threadingly engaging with either one of the protrusions to reserve therein the one protrusion. Such a combination bears the function of a screw spanner when the first engaging piece is put between the head and tail pieces and the other protrusion is screwed on the longitudinal hole and can bear the function of a screw nut breaker when the second engaging piece, instead of the first engaging piece, is put between the head and tail pieces.

3 Claims, 6 Drawing Figures

COMBINATION OF SCREW SPANNER AND NUT BREAKER

BACKGROUND OF THE INVENTION

The present invention relates to a screw nut breaker, and more particularly to a breaker diversified by introducing an additional function.

The known screw nut breaker, as shown in FIG. 1, includes a head piece 10, an engaging piece 11 and a tail piece 12. Head piece 10 has a nut receiving hole 13 and a female threaded longitudinal hole 14. A screw 15 is screwed into head piece 10 and protrudes in longitudinal hole 14. Tail piece 12 has a male threaded protrusion 16 capable of being screwed into longitudinal hole 14. Engaging piece 11 has a longitudinal groove 17 for being guided by screw 15 to slide in longitudinal hole 14 and has a knife edge 18 so that when protrusion 16 is screwed into longitudinal hole 14 a nut received in nut receiving hole 13 will be broken. While such a device can effectively break a nut, however, it is possible that the nut needs not be broken and can be screwed off. Thus, it is preferable if such a screw nut breaker be diversified to bear the function of a screw spanner to deal with the possibility described above, which is the attempt of the applicant.

SUMMARY OF THE INVENTION

It is therefore an object of the present invention to provide a screw nut breaker diversified with the function of a screw spanner.

It can be noted that a screw spanner thus embodied can be isolated from the screw nut ruiner to function independently.

According to the present invention, a screw spanner includes a head piece having a nut receiving hole and a female threaded longitudinal hole communicating with the nut receiving hole, a first engaging piece having a first front end and capable of sliding into the longitudinal hole and a tail piece having a first male threaded protrusion capable of urging the first engaging piece to slide toward the nut receiving hole when the first male threaded protrusion is secured on the female threaded longitudinal hole so that when the protrusion is screwed on the longitudinal hole to let a nutlike member be clamped by the first front end of the engaging piece and the wall defining the nut receiving hole, the head, the first engaging and the tail pieces will act as a screw spanner.

Preferably the screw spanner further comprises a second male threaded protrusion provided on the tail piece and coaxial and opposite with the first male threaded protrusion, a second engaging piece having a second front end having a knife edge and a female threaded cover capable of being screwed on the second male threaded protrusion to reserve therein either the first or second piece so that if the first engaging piece is replaced by the second engaging piece the function of a screw spanner changes to that of a screw nut breaker.

Preferably the first front end of the first engaging piece has a first angled surface formed to match a first angle surface of the nutlike member. The first engaging piece has a first longitudinal groove and the second engaging piece has a second longitudinal groove. The wall has a second angled surface formed to match a second angle surface of the nutlike member so that the first and second angled surfaces are capable of cooperating with each other to tightly clamp the nutlike member when the first male threaded protrusion is screwed into the female threaded longitudinal hole. The screw spanner further includes a screw screwed into the head piece and protruding in the longitudinal hole for engaging with the first or second longitudinal groove of the first or second engaging piece so that the first or second engaging piece will slide into the longitudinal hole without rotation.

The present invention may best be understood with reference to the accompanying drawings, in which:

DETAILED DESCRIPTION OF THE PREFERRED EMBODIMENT

Figure 1:
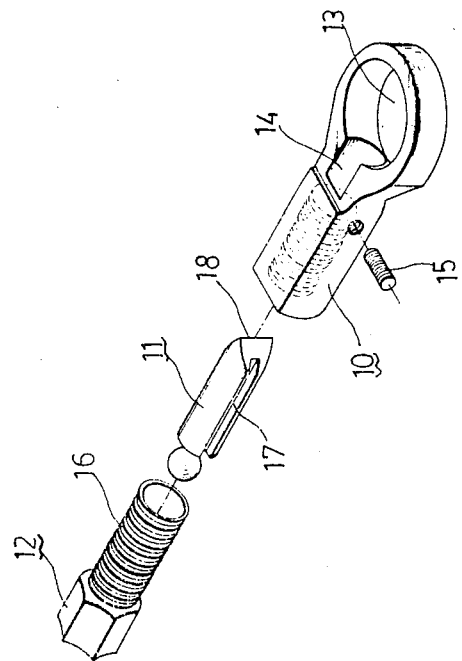
FIG. 1 is a perspective view showing a known screw nut breaker.
Figure 2:
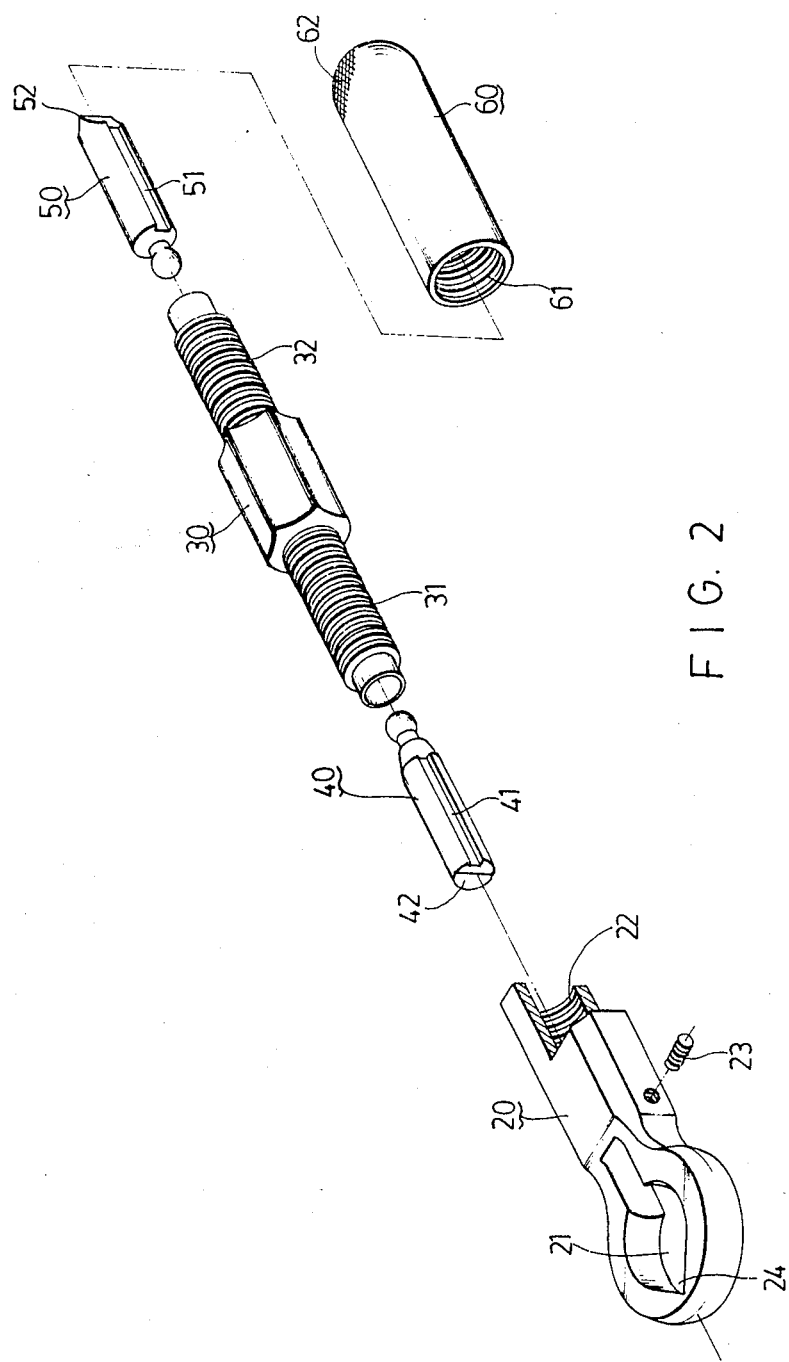
FIG. 2 is an exploded perspective view of a combination of screw spanner and nut breaker of a preferred embodiment of the present invention.

Referring now to FIG. 2, a combination of screw spanner and nut breaker includes a head piece 20, a tail piece 30, a first engaging piece 40, a second engaging piece 50 and a cover 60. Head piece 20 has a nut receiving hole 21 the defining wall of which has a first angled surface to match with a first angle surface of a nutlike member and a female threaded longitudinal hole 22 into which a screw 23 is screwed and protrudes. Tail piece 30 has a first and a second male threaded protrusions 31, 32, each of which being capable of urging either first 40 or second engaging piece 50 into longitudinal hole 22 to slide toward nut receiving hole 24 when screwed on female threaded longitudinal hole 22. First engaging piece 40 has a first longitudinal groove 41 capable of engaging with screw 23 so that piece 40 is guided to slide into hole 22 without rotation and a second angled surface 42 formed to match with a second angle surface of the nutlike member so that angled surfaces 24, 42 can clamp a nutlike member of variable sizes to function with head, tail and first engaging pieces 20, 30 and 40 as a shifting spanner when either one of protrusions 31, 32 is screwed into hole 22. Second engaging piece 50 has a second longitudinal groove 51 the function of which is the same as that of groove 41 and a knife edge 52 the function of which is the same as that of the prior art. Cover 60 has a female threaded hole 61 capable of threadingly engaging with one of protrusions 31, 32 to reserve therein one of engaging pieces 40, 50 that is not put between head and tail pieces 20, 30 and a knurled surface 62 for an easy grip. Thus, such a combination simultaneously bears the functions of a shifting screw spanner and a screw nut breaker.

Figure 4:
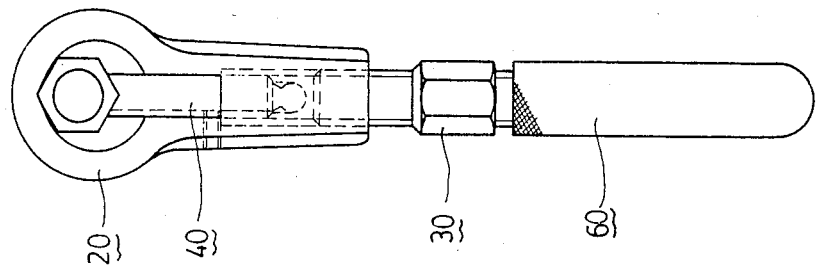
FIG. 4 is further a schematic view showing the preferred embodiment acting as a screw spanner.
Figure 3:
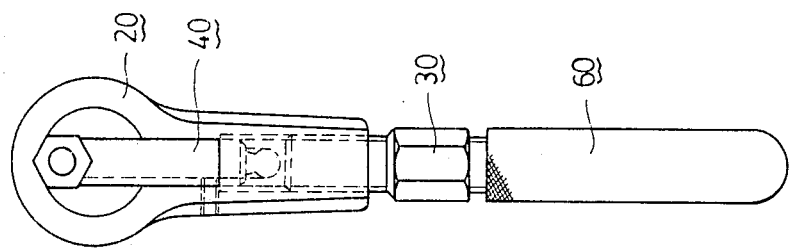
FIG. 3 is a schematic view showing a combination of screw spanner and nut breaker acting as a screw spanner.
Figure 6:
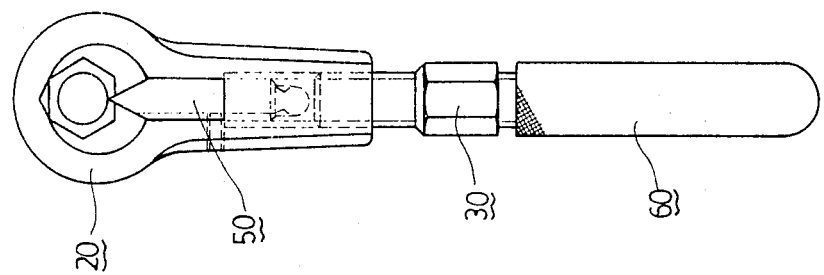
FIG. 6 is further a schematic view showing the preferred embodiment acting as a screw nut breaker.
Figure 5:
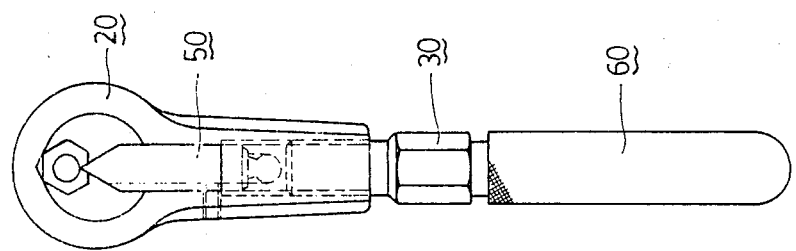
FIG. 5 is a schematic view showing a combination of screw spanner and nut breaker acting as a screw nut breaker.

FIGS. 3 and 4 show the present combination acting as a screw shifting spanner. FIGS. 5 and 6 show the present combination acting as a screw nut breaker.

While the present invention has been described in connection with what is presently considered to be the most practical and preferred embodiment, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all such modifications and equivalent structures.

What I claim is:

1. A combination screw spanner and nut breaker comprising: a head piece including a nut receiving hole and a female threaded longitudinal hole communicating with said nut receiving hole; a first engaging piece having a first front end and capable of sliding in said longitudinal hole; and a tail piece having a first male threaded protrusion capable of urging said first engaging piece to slide toward said nut receiving hole when said first male threaded protrusion is screwed into said female threaded longitudinal hole, whereby when said first engaging piece is put in said longitudinal hole and said first male threaded protrusion is screwed on said longitudinal hole said first front end and the wall defining said nut receiving hole can clamp a nutlike member and thus said head, said first engaging and said tail pieces act as a screw spanner; a second engaging piece having a second front end having a knife edge; whereby when said second engaging piece is put in said longitudinal hole and said first male threaded protrusion is screwed on said longitudinal hole said second front end and said wall can cooperate with each other to break said nutlike member and thus said head, said second engaging and said tail pieces act as a screw nut ruiner; and a second male threaded protrusion provided on said tail piece and coaxial and opposite with said first male threaded protrusion; and a female threaded cover capable of being screwed on said second male threaded protrusion to reserve one of said first and second engaging piece therein.

2. A combination screw spanner and nut breaker according to claim 1, wherein: said first front end of said first engaging piece has a first angled surface formed to match a first angle surface of said nutlike member; and said wall has a second angled surface formed to match a second angle surface of said nutlike member so that when said first engaging piece is put into said longitudinal hole, said first and second angle surfaces are capable of cooperating with each other to tightly clamp said nutlike member when said first male threaded protrusion is screwed on said female threaded longitudinal hole.

3. A combination screw spanner and nut breaker according to claim 1, wherein said first and second engaging pieces each have a longitudinal groove, and wherein a screw is screwed into said head piece and protrudes in said longitudinal hole for engaging with the longitudinal groove of one of said first and second engaging pieces so that said one of said first and second engaging pieces will slide in said longitudinal hole without rotation.

* * * * *